United States Patent [19]

Ambrosino et al.

[11] Patent Number: 4,812,250

[45] Date of Patent: Mar. 14, 1989

[54] WORKING FLUID MIXTURES FOR USE IN THERMODYNAMIC COMPRESSION CYCLES COMPRISING TRIFLUOROMETHANE AND CHLORODIFLUOROETHANE

[75] Inventors: Jean-Louis Ambrosino, Suresnes; Choua Cohen, Lyons; Jacques Cheron, Maisons Laffitte; Alexandre Rouey, Garches, all of France

[73] Assignee: Institut Francais du Petrole, Rueil-Malmaison, France

[21] Appl. No.: 124,144

[22] Filed: Nov. 23, 1987

[30] Foreign Application Priority Data

Nov. 21, 1986 [FR] France ................................ 86 16363

[51] Int. Cl.$^4$ .............................................. C09K 5/04
[52] U.S. Cl. ........................................ 252/67; 62/114
[58] Field of Search ............................ 252/67; 62/114

[56] References Cited

U.S. PATENT DOCUMENTS

| | | | |
|---|---|---|---|
| 4,089,186 | 5/1978 | Rojey et al. | 62/107 |
| 4,344,292 | 8/1982 | Rojey | 62/114 |
| 4,350,020 | 9/1982 | Rojey | 62/93 |
| 4,406,135 | 9/1983 | Rojey et al. | 62/114 |
| 4,680,939 | 7/1987 | Rojey et al. | 62/114 |

FOREIGN PATENT DOCUMENTS 117580 7/1984 Japan ................................ 252/67

*Primary Examiner*—Robert A. Wax
*Attorney, Agent, or Firm*—Millen & White

[57] ABSTRACT

The invention concerns non-azeotropic fluid mixtures useful in compression thermodynamic cycles, for example in heat pumps, comprising R23, R142b and optionally a fluid (c) other than R23 or R142b, selected from the group formed of methane and ethane halogenated compounds having a boiling point from −85 to +60° C., in such molar proportions that the R23/R142b ratio range from 0.01:1 to 1.10:1 and the (R23+R142b)/(R23+R142b +c) molar ratio from 0.26:1 to 1:1.

The mixtures according to the invention can be used as working fluid for heat pumps whose fluid circulates through an evaporator ($E_1$), a compressor ($K_1$), a condenser ($E_2$) and a pressure reducer ($D_1$). The thermal exchanges take place respectively with external fluids (5,6) and (7,8).

The mixtures according to the invention may supply heat to the condenser at a temperature from +50 to +100° C. while having an internal pressure generally limited to 0.3 MPa.

9 Claims, 1 Drawing Sheet

WORKING FLUID MIXTURES FOR USE IN THERMODYNAMIC COMPRESSION CYCLES COMPRISING TRIFLUOROMETHANE AND CHLORODIFLUOROETHANE

The invention concerns fluid mixtures for heat pumps and a process for heating and/or thermally conditioning a building by means of compression heat pump using mixed working fluids.

BACKGROUND OF THE INVENTION

The use of non-azeotropic fluid mixtures in a compression thermodynamic cycle, and for example in a heat pump, in order to improve the performance coefficient of said heat pump, has been the object of prior French patent application Nos. 2 337 855, 2 474 151, 2 474 666 and 2 497 931 corresponding to U.S. Pat. Nos. 4,089,186; 4,344,292; 4,350,020 and 4,406,135.

In particular, the published French patent application No. 2 474 151 discloses non-azeotropic mixtures having two constituents providing for an increase of the performances of a heat pump and hence a reduced operating cost thereof. The disclosed 2-constituent mixtures, however, do not provide for an increase of the thermal power for a given compressor.

The present invention has for object to provide specific fluids whereby the supplied thermal power and/or the performance coefficient of a heat pump may be increased. By using the fluid mixtures proposed according to the invention in a heat pump, it is thus possible to reduce the investment cost and the operation cost. As a matter of fact, the use of mixed working fluids according to the invention make possible an increase of the thermal capacity of a given heat pump, without modifying the components thereof, particularly without modification of the compressor. These fluid mixtures also provide for an increase of the performance coefficient.

Two conventional means can be used to increase the thermal power supplied by a heat pump. A first one is to equip said pump with a compressor of larger capacity, so as to suck in a larger input volume, but at the cost of an overinvestment. The other means for increasing the thermal capacity of the heat pump consists of using a working fluid whose boiling point is lower than that of the usual fluid. Such a substitution always results in a degradation of the performance coefficient and also in a more restrictive range of use of the machine, in view of the generally lower critical temperature of the fluid of lower boiling point.

SUMMARY OF THE INVENTION

The principle of the invention consists of selecting a specific non-azeotropic fluid mixture characterized in that it comprises:

(α) (R23) trifluoromethane: fluid (a)

(β) 1-chloro 1,1-difluoroethane (R142b): fluid (b), and (γ) optionally at least one fluid (c) selected from the group formed of methane and ethane halogenated compounds, other than R23 and R142b, having a boiling point, under atmospheric pressure, from about −85° to about +60° C., preferably from about −60° to about +50° C., the molar proportions of fluids (a), (b) and (c) in the non-azeotropic fluid mixture, being such that the molar ratio a/b ranges from 0.01:1 to 1.10:1, preferably from 0.05:1 to 1.10:1 and more preferably from 0.07:1 to 1.10:1, the (a+b)/(a+b+c) molar ratio being from 0.26:1 to 1:1.

In an advantageous embodiment of the invention, the mixture contains at least one fluid (c), the a/b molar ratio being maintained within the above-defined ranges, the amount of fluid (a), in moles, in the mixture, being preferably at least 1% and the (a+b)/(a+b+c) molar ratio being then usually from 0.26:1 to 0.70:1 and more preferably from 0.26:1 to 0.55:1.

The mixture preferably comprises three separate fluids, fluid (c) of this 3-fluid mixture being also optionally an azeotropic mixture behaving as a single fluid.

According to the present invention, methane and ethane halogenated compound is used to designate all the derivatives of any one of said hydrocarbons comprising at least one halogen such as chlorine, fluorine, bromine or iodine in their molecule. Preferred compounds comprise at least one fluorine atom and optionally at least one chlorine atom but no bromine and/or iodine atom in their molecule.

Examples of (c) fluids are: monochlorodifluoromethane (R22), dichlorodifluoromethane (R12), R500 azeotropic mixture containing by weight 73.8% of R12 and 26.2% of 1,1-difluoroethane (R152a) and R502 azeotropic mixture comprising by weight 48.8% of R22 and 51.2% of chloropentafluoroethane (R115).

According to the present invention, by non-azeotropic mixture it is meant a mixture of fluids comprising at least two separate fluids having, at constant pressure, a temperature of liquid-vapor change of state which is not steady.

In the cycle of a given heat pump, under identical operating conditions, the evaporation pressure of a mixture of the preceding type is higher, everything else being unchanged, than the evaporation pressure of the one or more fluids which might be used without fluid (a).

Consequently, the molar volume of the vapors sucked into the compressor is lower, which results, for a compressor of given cylinder capacity, in an increase of the fluid molar flow rate and hence of the thermal capacity of the heat pump. On the other hand, the use of a mixed working fluid comprising at lease one fluid (c), R142b and R23, generally leads to an increase of the volume yield of reciprocating compressors and is hence also favorable to an increase of the thermal capacity. The increase of the volume yield is the higher as the molar concentration of fluid (a) is high. The molar fraction of fluid (a) (R23) must range within the above-defined limits since a too high proportion results in an excessive condensation pressure.

As a matter of fact, the compressors have a field of use limited by certain operating parameters (maximum output temperature and pressure difference) and particularly by the maximum output pressure. The condensation pressure of a mixture according to the invention will preferably be lower than 30 bar (0.3 MPa).

The fluid mixtures proposed according to the invention can be used more particularly when the output temperature of the external fluid circulating through the condenser preferably ranges from +50° C. to +100° C. In these conditions they may keep the condensation pressure lower than 0.3 MPa whereas the fluids currently used in the prior art, in the same conditions, lead to much higher pressures, sometimes exceeding 0.45 MPa, at which conventional machines can no longer be used.

The heat pumps wherein the above-defined mixtures can be used are of any type operating generally with a condensation step, an expansion step, an evaporation step and a step of compression of the non-azeotropic mixture used as working fluid. The compressor may be, for example, a compressor with lubricated or dry pistons, a screw compressor, or a centrifugal compressor. The exchangers may be, for example, double-pipe exchangers, shell-and-tube exchangers, plate exchangers, lamellate exchangers or conventional finned-tube exchangers for heat transfer with air. A total counter-current exchange mode is preferred. It is well achieved in co-axial exchangers used for water/coolant exchanges in heat pumps of low power. It may be achieved approximately in air/coolant exchangers according to the arrangement disclosed in the French patent application 2 474 666. The delivered thermal power may vary, for example, from a few kilowatts to several megawatts.

A preferred operating mode is that disclosed in the French patent application No. 2 497 931.

This operating mode comprises the following steps of:

(a) compressing the mixed working fluid in vapor phase, (b) contacting, for heat exchange, the compressed mixed fluid originating from step (a) with a relatively cold external fluid to be heated, and maintaining said contact up to substantially complete condensation of said mixed fluid, (c) contacting, for heat exchange, the substantially completely condensed mixed fluid originating from step (b) with a cooling fluid defined in step (f), so as to further cool said mixed fluid, (d) expanding the cooled mixed fluid originating from step (c), (e) contacting, for heat exchange, the expanded mixed fluid originating from step (d) with an external fluid used as heat source, the conditions of contact providing for the partial vaporization of said expanded mixed fluid, (f) contacting, for heat exchange, the partially vaporized mixed fluid originating from step (e) with the substantially completely liquefied mixed fluid supplied to step (c), said partially vaporized mixed fluid forming the cooling fluid of said step (c), the contact conditions being such as to continue the vaporization initiated in step (e), and (g) recycling the vaporized mixed fluid, originating from step (f), to step (a).

BRIEF DESCRIPTION OF THE DRAWINGS

The invention will be now described more in detail by way of illustrative and non-limiting examples, with reference to the accompanying drawings wherein.

EXAMPLES

The following examples illustrate the use of specific fluid mixtures according to the invention and must not be considered as limiting the scope thereof.

Example 1

Figure 1:
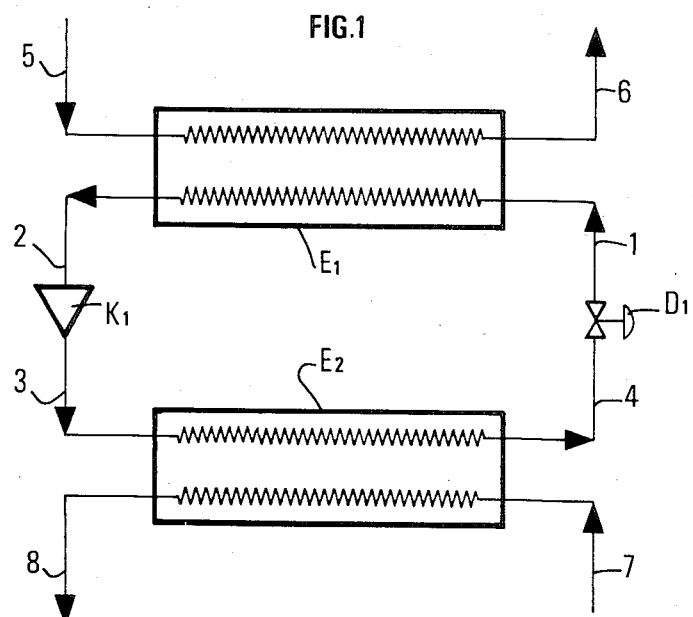
FIG. 1 diagrammatically shows a conventional arrangement of a water/water heat pump wherein the mixtures according to the invention can be used. It will be described in detail hereinafter in connection with example 1.

The heat pump operating flowsheet is shown in FIG. 1.

The mixed working fluid, supplied from the pressure reducer, through line 1, is partially vaporized in evaporator $E_1$ by cooling the water of the cold source, in counter-current flow with the working fluid, supplied to evaporator $E_1$ through line 5 and discharged therefrom through line 6. The working mixture flowing out from evaporator $E_1$ through line 2, is completely vaporized.

The mixed working fluid, in gas state, is sucked into compressor $K_1$ through line 2 and is discharged under high pressure through line 3. The working fluid is condensed in condenser $E_2$ wherein it enters through line 3 and wherefrom it is discharged as liquid through line 4. During the condensation in $E_2$ the mixture transfers useful heat power to water of the external circuit which, between the input line 7 and the output line 8, circulates in counter-current of the working fluid. The mixture, after condesation in $E_2$, is fed to pressure reducer $D_1$ through line 4.

The operating conditions are as follows: water temperature at condenser input: $+58°$ C., water temperature at condenser output: $+68°$ C., water temperature at input of evaporator $E_1$: $+34.4°$ C., water temperature at output of evaporator $E1$: $+29.6°$ C. The results are given in Table 1 below. The mixed working fluid is a mixture of R23 and R142b comprising 5% by mole of R23 and 95% of R142b.

TABLE 1

| Fluid (molar fraction) | $Q_{cond}$* | $Q_{evap}$* | W* | COP* |
|---|---|---|---|---|
| R23(0.05)—R142b(0.95) | 6430 | 4750 | 1680 | 3.83 |

*$Q_{cond}$: thermal power in watts supplied to condenser.
$Q_{evap}$: thermal power in watts consumed at evaporator.
W: compression power in watts transferred to the working fluid.
COP: ratio of the thermal power supplied at condenser to the compression power transmitted to the working fluid.

Example 2

Figure 2:
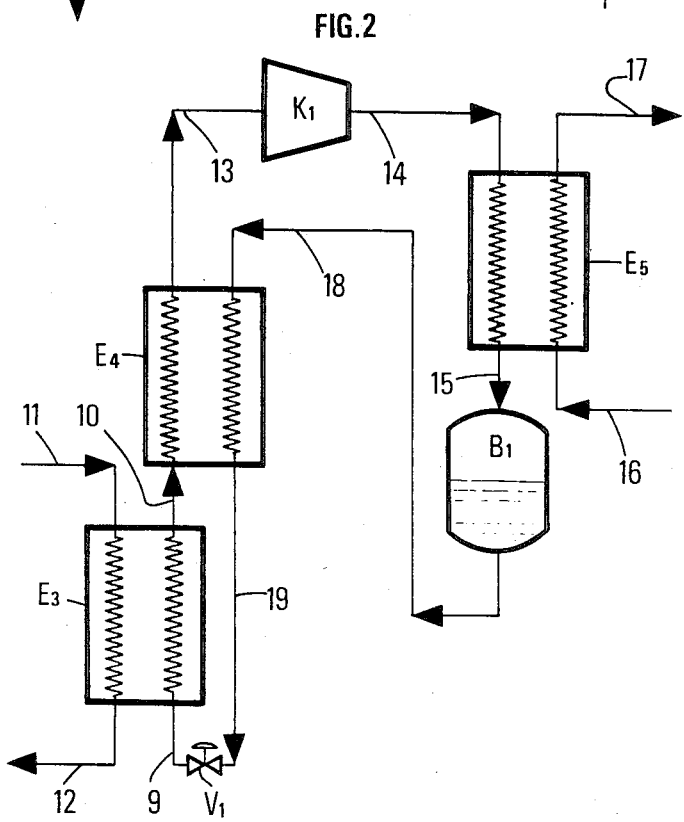
FIG. 2 illustrates another heat pump arrangement where the mixtures according to the invention can be used. It will be described in detail, hereinafter, in connection with example 2.

The heat pump flowsheet is shown in FIG. 2.

The mixed working fluid, supplied from pressure reducer through line 9, is partially vaporized in evaporator $E_3$ by cooling water of the cold source, flowing in counter-current of the working fluid, fed to evaporator $E_3$ through line 11 and discharged therefrom through line 12. The working mixture discharged through line 10 is entirely vaporized and eventually overheated in exhanger $E_4$, by counter-current exchange with the sub-cooled condensate fed to $E_4$ through line 18 and dicharged therefrom through line 19.

The mixed working fluid in gas state is sucked into compressor $K_1$ through line 13 and is discharged under high pression through line 14. Then, it is sub-cooled and completely condensed in condenser $E_5$ where it enters through line 14 and wherefrom it flows out, as saturated liquid, through line 15. During condensation in $E_5$, the mixture transfers useful thermal power to water of the external circuit which, between the input line 16 and the output line 17, circulates in counter-current of the working fluid. The mixture, after condensation in $E_5$, enters, through line 15, into the receiver $B_1$ and flows out therefrom through line 18. It is then sub-cooled in exchanger $E_4$ and is conveyed to pressure reducer $V_1$ through line 19.

As concerns capacity, this flowsheet provides an improvement when the working fluid is a mixture of non-azeotropic fluids, since exchanger E4, where vaporisation is completed, provides for a higher final boiling temperature of the mixture, hence for a higher suction pressure.

The operating conditions are as follows:
water temperature at condenser input: +40° C.
water temperature at condenser output: +50° C.,
water temperature at the input of evaporator E3: +35° C.,
water temperature at the output of evaporator E3: +27° C.

The results are summarized in Table 2 below.

TABLE 2

| Fluid (molar fraction) | $Q_{cond}$* | $Q_{evap}$* | W* | COP* | $P_{Cf}$* |
|---|---|---|---|---|---|
| R12 (comparative) | 6830 | 5600 | 1230 | 5.55 | 0.128 |
| R23(0.14)—R142b(0.13) R22(0.73) | 12120 | 10080 | 2040 | 5.94 | 0.216 |
| R23(0.03)—R142b(0.20) R22(0.77) (comparative) | 9800 | 8150 | 1650 | 5.94 | 0.169 |

*$P_{Cf}$: Pressure at condenser input of the cooling fluid, in MPa.
*notations are the same as in example 1.

When using the R23(0.14)—R142b(0.13)—R22(0.73) ternary mixture according to the invention, the thermal power delivered at the condenser is 77% higher than with the use of R12, and about 24% higher than with the use of R23—R142b—R22 ternary mixture not conforming with the invention. This power gain is accompanied with an improvement in the performance coefficient.

Example 3

The operating flowsheet of the heat pump is shown in FIG. 1.

The mixed working fluid, flowing out from the pressure reducer through line 1, is partially vaporized in evaporator E1 by cooling the water of the cold source, flowing in counter-current of the working fluid, supplied through line 5 to evaporator E1 and discharged therefrom through line 6. The working fluid discharged from evaporator E1 through line 2 is completely vaporized.

The mixed working fluid, in gas state, is sucked into compressor K1 from line 2 and discharged at high pressure through line 3. The working fluid is condensed in condenser E2 to which it is supplied through line 3 and wherefrom it is discharged as liquid through line 4. During condensation in E2 the mixture transfers useful thermal power to water of the external circuit which, between input pipe 7 and output pipe 8, flows in counter-current of the working fluid. The mixture, after condensation in E2, is supplied to pressure reducer D1 through line 4.

The operating conditions are as follows: water temperature at condenser input: +48° C., water temperature at condenser output: +58° C., water temperature at input of evaporator E1: +45° C., water temperature at output of evaporator E1: +35° C. The results are given in Table III below.

TABLE III

| Fluid (molar fraction) | $Q_{cond}$* | $Q_{evap}$* | W* | COP* | $P_{Cf}$* |
|---|---|---|---|---|---|
| R23(0.03)—R142b(0.2425) —R22(0.7275) | 18690 | 15890 | 2800 | 6.68 | 0.197 |

TABLE III-continued

| Fluid (molar fraction) | $Q_{cond}$* | $Q_{evap}$* | W* | COP* | $P_{Cf}$* |
|---|---|---|---|---|---|
| R142b(0.25)—R22(0.75) | 17760 | 15100 | 2660 | 6.68 | 0.187 |

*notations are the same as in examples 1 and 2.

Example 4

Other mixtures, whose composition is given hereinafter by molar fraction, have been used in a heat pump of the water/water type and have supplied a high thermal power. The internal pressure in the heat pump was at most 0.3 MPa.

| (a) | R23 | 0.1 mole | R142b | 0.40 mole | R22 | 0.50 mole |
| (b) | R23 | 0.08 mole | R142b | 0.37 mole | R12 | 0.55 mole |
| (c) | R23 | 0.1 mole | R142b | 0.37 mole | R502 | 0.53 mole |
| (d) | R23 | 0.15 mole | R142b | 0.15 mole | R500 | 0.70 mole |
| (e) | R23 | 0.05 mole | R142b | 0.35 mole | R22 | 0.60 mole |
| (f) | R23 | 0.03 mole | R142b | 0.24 mole | R22 | 0.73 mole |
| (g) | R23 | 0.02 mole | R142b | 0.24 mole | R22 | 0.74 mole |

The non-azeotropic mixtures according to the invention have the particular advantage to make it possible to operate heat pumps with an internal pressure limited to 0.3 MPa (30 bar), even when heat is supplied to the condenser at a temperature close to 100° C., by adjusting the molar compositions of the constituents. As a matter of fact, whereas the pressure-temperature relationship cannot be modified for a pure substance, on the contrary, it is possible, for a mixture, to lower the condensation pressure at a given temperature.

What is claimed as the invention is:

1. A non-azeotropic fluid mixture for use in compression thermodynamic cycles, characterized in that it comprises:
   (α) trifluoromethane (fluid (a)),
   (β) 1-chloro 1,1-difluoroethane (fluid (b)), and
   (γ) optionally at least one fluid (c) different from fluid (a) and from fluid (b), selected from the group formed of methane and ethane halogenated compounds having a boiling temperature under atmospheric pressure from about −85° C. to about +60° C., the molar proportions of said fluids in the non-azeotropic mixture being such the a/b molar ratio ranges from 0.01:1 to 1.10:1 and the (a+b)/(a+b+c) molar ratio ranges from 0.26:1 to 1:1.

2. A non-azeotropic mixture according to claim 1, characterized in that it contains at least one fluid (c) and in that the molar proportions of the fluids in the mixture are such that the a/b molar ratio ranges from 0.05:1 to 1.10:1 and the (a+b)/(a+b+c) molar ratio from 0.26:1 to 0.070:1.

3. A non-azeotropic mixture according to claim 2, wherein the fluid molar proportions are such that the a/b molar ratio ranges from 0.07:1 to 1.10:1 and the (a+b)/(a+b+c) molar ratio from 0.26:1 to 0.55:1.

4. A non-azeotropic mixture according to claim 1, wherein fluid (c) is selected from the group consisting of R22, R12, R500 and R502.

5. A building heat and/or heat conditioning process by means of a compression heat pump using as working fluid a non-azeotropic fluid mixture according to claim 1, said heat pump operating with a condensation step, an expansion step, an evaporation step and a compression step of said working fluid.

6. A process according to claim 5, wherein the external fluid to be heated, flowing through the condenser is a temperature from about 50° to about 100° C. at the output of the condenser.

7. A process according to claim 5, wherein the operation of the heat pump comprises the steps of (a) compressing the working fluid in vapor phase, (b) contacting in heat exchange conditions, the compressed working fluid originating from step (a) with an external cooling fluid and maintaining said contact up to the substantially complete condensation of said working fluid, (c) contacting in heat exchange conditions the substantially completely condensed working fluid originating from step (b) with a cooling fluid defined in step (f), so as to further cool said working fluid, (d) expanding the cold working fluid originating from step (c), (e) contacting the expanded working fluid originating from step (d), in heat exchange relation with an external fluid forming a heat source, the contact conditions being such as to provide for the partial vaporization of said expanded working fluid, (f) contacting the partially vaporized working fluid originating from step (e) in heat exchange conditions with the substantially completely liquefied working fluid fed to step (c), said partially vaporized working fluid forming the cooling fluid of said step (c), the contact conditions being such as to continue the vaporization initiated in step (e), and (g) feeding back the vaporized mixed fluid originating from step (f) to step (a).

8. A process according to claim 5, wherein the heat exchanges with the one or more external fluids are performed in exchangers providing for a heat exchange of a total counter-current exchange mode type.

9. A process according to claim 5, wherein the non-azeotropic mixture composition is so selected that the condensation pressure of said mixture is lower than 0.3 MPa.

* * * * *